United States Patent [19]

Bovio et al.

[11] Patent Number: 4,493,038
[45] Date of Patent: Jan. 8, 1985

[54] DATA RECORDING MACHINE

[75] Inventors: Michele Bovio, Brosso; Walter Gillone, Ivrea, both of Italy

[73] Assignee: Ing. C. Olivetti & C., S.p.A., Ivrea, Italy

[21] Appl. No.: 333,937

[22] Filed: Dec. 23, 1981

[30] Foreign Application Priority Data

Dec. 24, 1980 [IT] Italy ............................... 68977 A/80
Dec. 24, 1980 [IT] Italy ............................... 68978 A/80

[51] Int. Cl.³ ............................................. G06F 11/00
[52] U.S. Cl. ..................................... 364/405; 377/15; 377/16; 235/2; 235/376
[58] Field of Search ................. 377/15, 16, 38; 235/3, 235/2; 364/405, 404, 900

[56] References Cited

U.S. PATENT DOCUMENTS

| | | | |
|---|---|---|---|
| 3,719,805 | 3/1973 | Tano | 377/38 |
| 4,220,991 | 9/1980 | Hamano et al. | 364/405 |
| 4,276,598 | 6/1981 | Inoue et al. | 364/405 |
| 4,319,326 | 3/1982 | Uchida | 364/405 |

Primary Examiner—John S. Heyman
Attorney, Agent, or Firm—Banner, Birch, McKie & Beckett

[57] ABSTRACT

A cash register with a keyboard (31), journal printer (47) and a check slip printer (32) is controlled by a microprocessor system with a CPU (102), a program ROM (105) and a RAM (106) including various registers for storing running totals of various types. The printer (32) prints till receipts and end-of-day check slips authenticating non-rigged operation of the cash register. Thus, each time such a check slip is printed a fresh bit of an EPROM memory (106) is set from 1 to 0 under control of a register (181) and a pulser circuit (191), the EPROM being fixed non-removably to the machine and shielded against UV erasure. The printed check slip includes the serial number thereof as represented by the EPROM contents, a special symbol identifying a non-manipulatable machine and the machine number recorded in a section (161) of the EPROM. In a modified embodiment the EPROM is replaced by a counter, e.g. a mechanical counter, which can only be incremented (and cannot be decremented or zeroized). The counter is incremented each time a check slip is printed and the number in the counter is included in the printout. Check slips with unbroken series of check slip numbers provide evidence of non-rigged operation.

17 Claims, 10 Drawing Figures

DATA RECORDING MACHINE

SUMMARY OF THE INVENTION

The present invention relates to a data recording machine of the type comprising an accumulator for storing the total of a series of operations on this data and output means actuable to supply this total as output. A prime example of such a machine is a cash register. One of the main purposes of a data recording machine is to record the operations effected faithfully and avoid any possibility of this data being altered after recording by trickery or deceit.

This object is achieved by the machine of the invention, which is characterised by a purely incremental, non-decrementable and non-zeroizable counter fixed irremovably to the machine for recording in succession each actuation of the output means and supplying as output, together with the total, the number of actuations of the output means recorded in the said counter.

According to another characteristic, there is provided a device in which data identifying the machine is contained substantially permanently, the output means supplying as output, together with the total, an identifying datum unambiguously associated with the identifying data of the said device.

According to a further characteristic, the machine supplies as output an identifying logotype comprising a specific registered number of the machine and a graphic symbol adjacent the registered number and indicating that the machine is not manipulatable, or cannot be rigged.

As an alternative, the machine is characterised by a monorecordable memory fixed irremovably to the machine and provided with cells recordable in order so as to store each actuation of the said member permanently and non-erasably and supply as output, together with the total, the number of actuations of the output means stored in the cells of the monorecordable memory.

According to another characteristic, there are provided a monorecordable memory in which data identifying the machine is stored substantially permanently, and output means supplying as output, together with the total, a logotype associated with the data identifying the machine stored in the monorecordable memory.

According to a further characteristic, the machine supplies as output an identifying logotype comprising a specific registered number of the machine, printed by means of a dot matrix, and a graphic symbol adjacent the registered number and obtained as a combination of dot matrices which exclude alphanumeric character codes.

The invention will be described in more detail, by way of example, with reference to the accompanying drawings, in which:

DESCRIPTION OF THE DRAWING

FIG. 10 shows a variant of the detail of FIG. 7.

DESCRIPTION OF THE ILLUSTRATED EMBODIMENT

Figure 1:
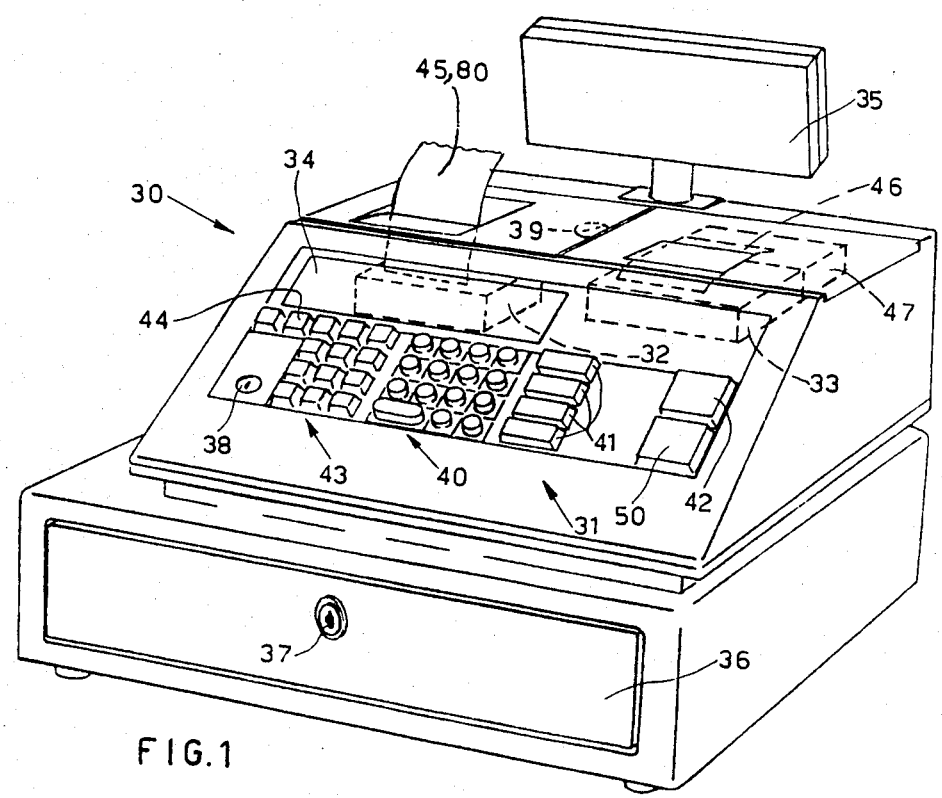
FIG. 1 is a view of a cash register embodying the invention.

The cash register 30 shown in FIG. 1 is particularly suitable for recording transactions and comprises a keyboard 31, a pair of printers 32 and 33 for printing, respectively, a check slip 45 and a journal strip 46, of known type, for example as described in our Italian Pat. No. 1,036,375, and a journal strip rewinder 47, which is also of known type. The term "check slip" rather than "till receipt" is employed because the printer 32 is used to print end of day check slips as well as till receipts for each customer transaction. The machine 30 moreover comprises two visual display panels 34 and 35 for the operator and customer, respectively, with indicators for the type of transaction, a till 36 and locks 37, 38 and 39, these being respectively the till, main and journal locks for reserving given operations solely for authorised staff.

Figure 2:
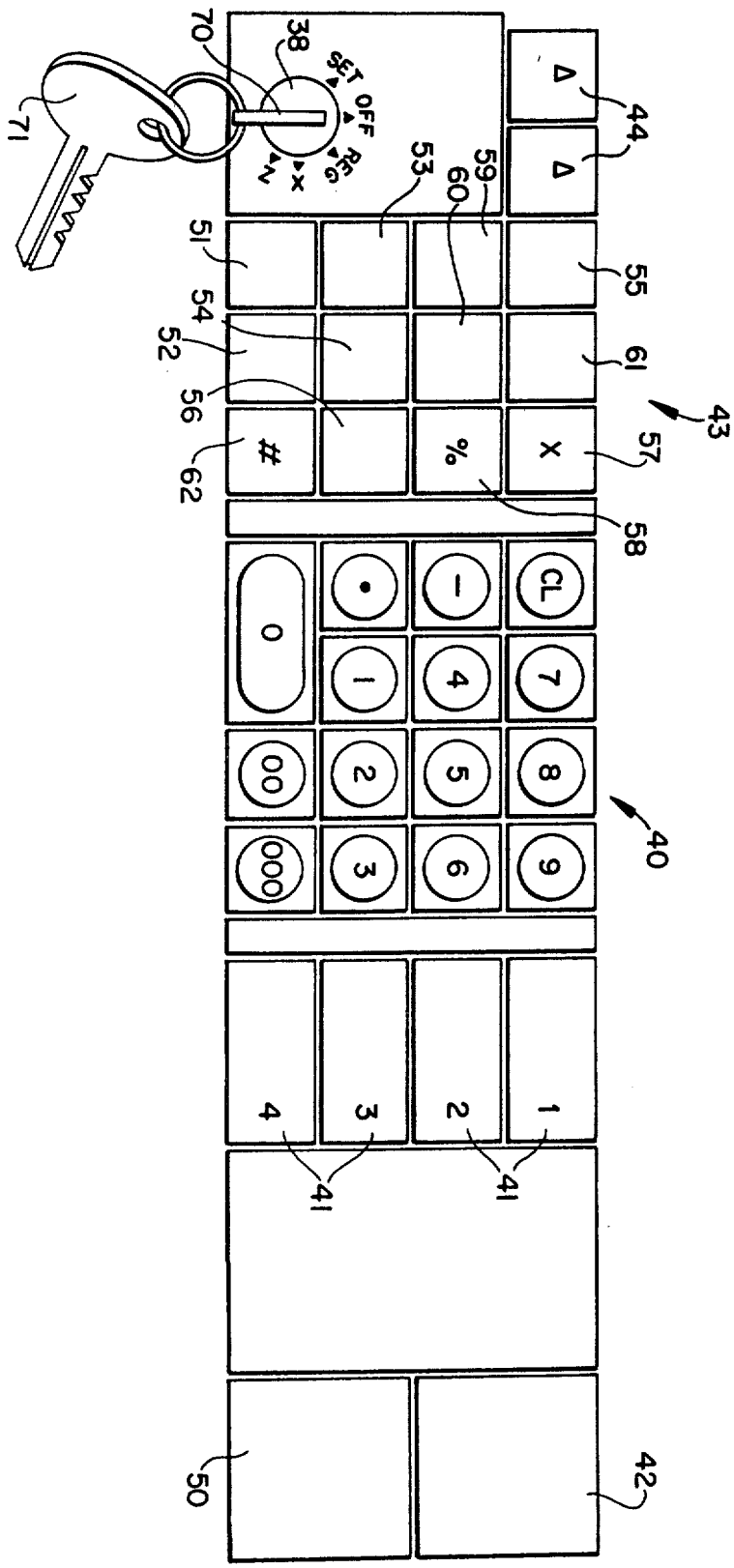
FIG. 2 shows a detail of FIG. 1.

The keyboard 31 (FIGS. 1 and 2) comprises five sections with numerical keys 40, department keys 41, a sub-total key 42 and a total key 50, function keys 43 and control keys 44 for the printers.

The numerical keys 40 enter the numerals 0 to 9, the double and triple zero and the decimal point. The keys "—" and "CL" actuate the correction of erroneous check slips and the cancellation of the entry, respectively. The department keys 41 allow distribution of the amounts introduced over various accumulators and the printing thereof on the check slip. The sub-total and total keys 42 and 50 activate printout and visual display of sub-totals and/or totals for each individual transaction, calculation, printout and visual display of the change to be given to the customer and activate the printing of the check slip (till receipt) for the customer, moreover causing the opening of the till.

The function keys 43 comprise twelve keys, of which the key 51 (CRED) relates to credit sales with accumulation in a corresponding register for the end-of-day totals. The key 52 (CORR) cancels an erroneous check slip and corrects the accumulated data. The keys 53 (CASH IN) and 54 (CASH OUT) relate to cash movements without recording in the department or transaction accumulators, which are accumulated in a corresponding register for the end-of-day totals. The key 55 (REFUND) relates to returned goods the amount of which is accumulated in a corresponding register for the end-of-day totals. The key 56 (DATE) activates the ejection of the check slip in cases of refund, opening of the till, receipts and outgoings of cash, with heading (stamp and date) of the next check slip and verification of the date entered. The key 57 (X) activates the calculation of price from unit price and quantity. The key 58 (%) calculates discounts, or reductions, or increases expressed in percentages. The keys 59 (REDN) and 60 (INC) calculate reductions and increases in previously fixed price or in percentage with accumulation in a corresponding register for the end-of-day totals. The key 61 (OPEN TILL) opens the till and the key 62 (#) prints numerical data without affecting calculations, accumulations etc.

The control keys 44 for the printers comprise the keys RECEIPT and JOURNAL for rapid advance of the paper of the check slip printer and of the paper of the journal printer.

The main lock 38 accepts two types of keys: a supervisor key 70, which can be turned into any one of the five positions "OFF", "REG", "X", "Z" and "SET", and an operator key 71 which can be turned only into one of the positions "OFF", "REG" and "X". The lock 38 is provided with a switch which, by turning the key 70 or 71 into the appropriate positions, establishes the operating mode of the machine by varying the keyboard functions thereof and, in the event of no key being inserted in the lock 38, disables the keyboard.

Figure 3:
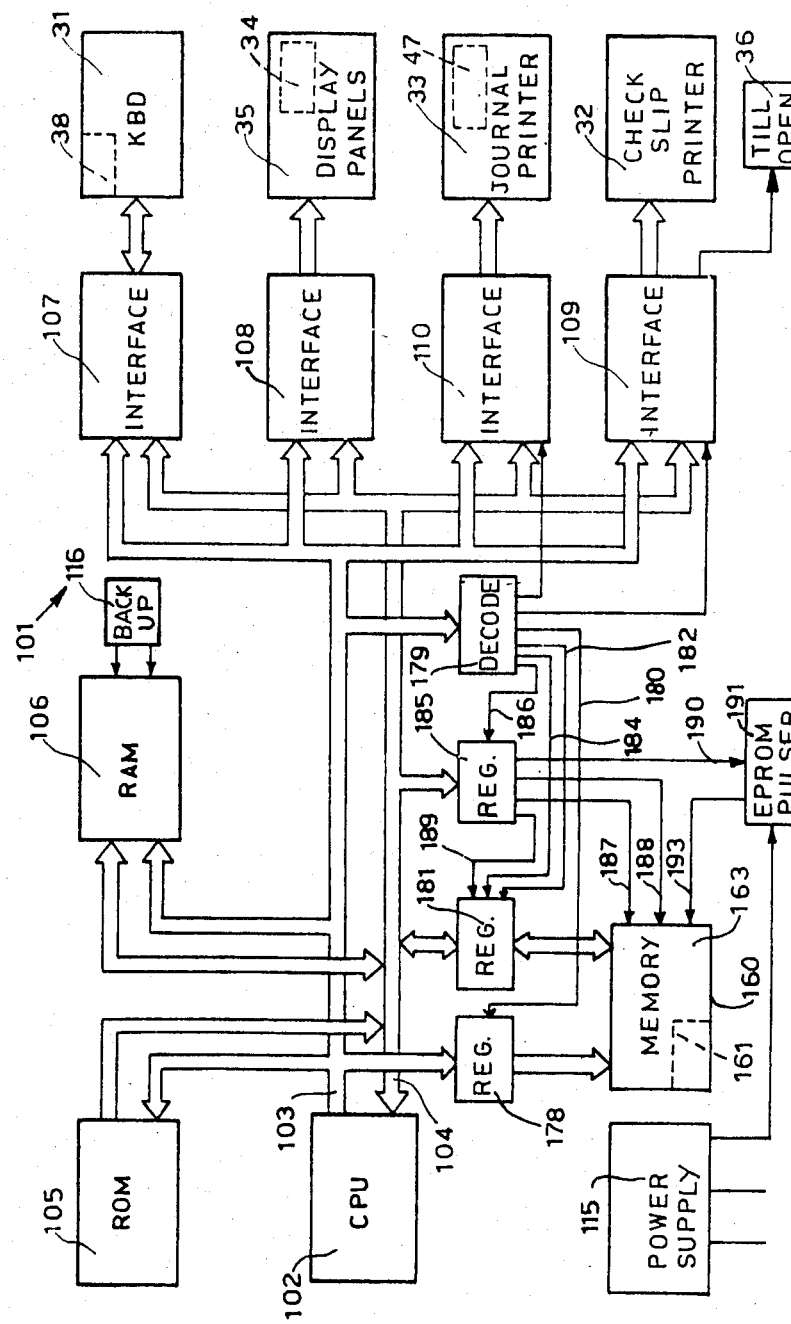
FIG. 3 is a simplified block diagram of the control and command circuits of the machine of FIG. 1.
Figure 9:
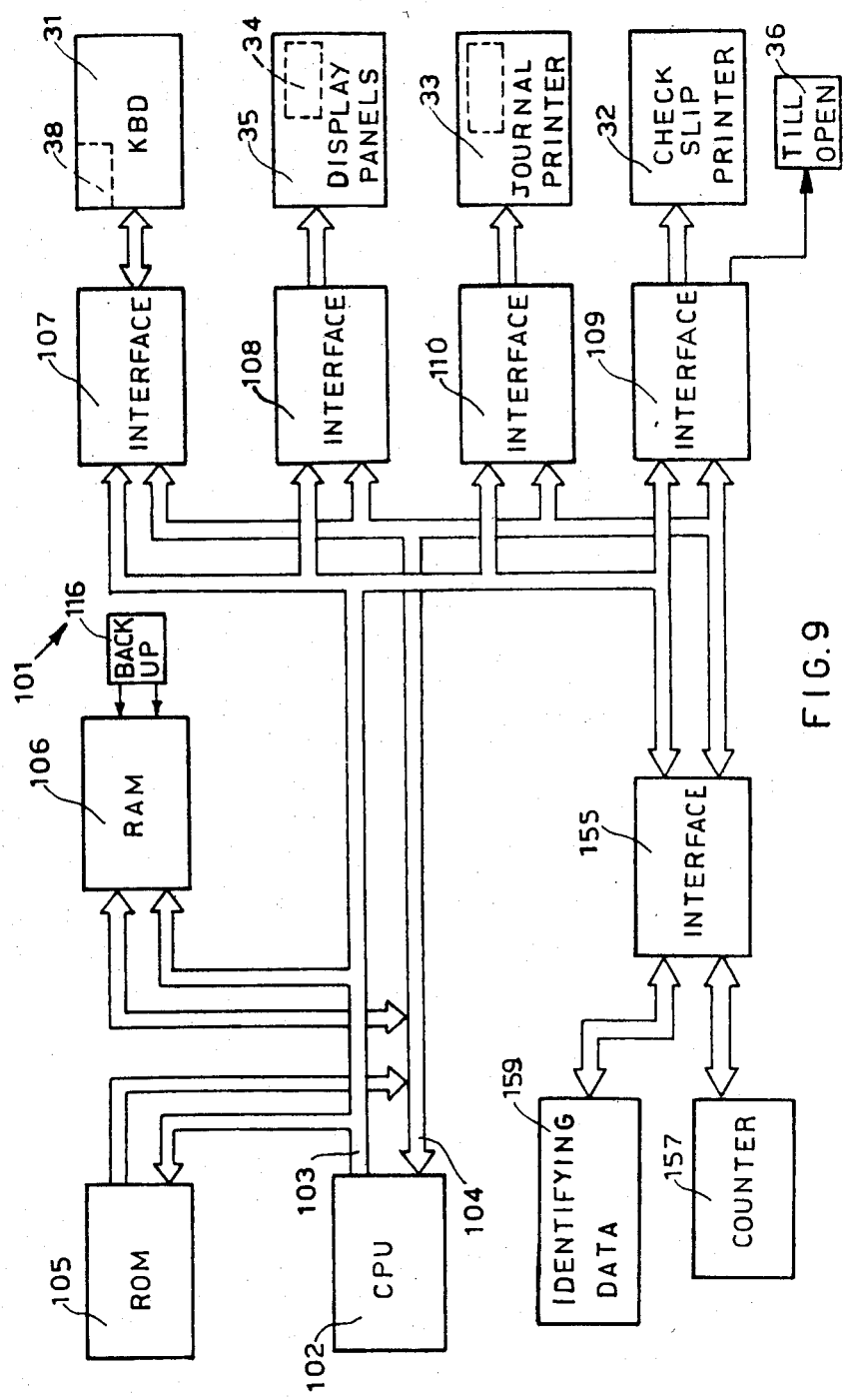
FIG. 9 is a block diagram of a variant of the control circuits of the machine of FIG. 1.

The various functions of the machine 30 are controlled and commanded by an electronic circuit 101 with a microprocessor, a simplified block diagram of which is shown for two different embodiments in FIGS. 3 and 9. The circuit 101 comprises a central unit or CPU 102 connected by means of an address bus 103 and a data bus 104 to a memory ROM 105 and to a memory RAM 106. Four interface and controller circuits 107, 108, 109 and 110 respectively connect the central unit 102 to the keyboard 31 and the switch of the lock 38, to the visual display panels 34 and 35, to the printer 32 and the opening control of the till 36, and to the printer 33 and the rewinder 47. A power supply 115 provides the input to the various components of the circuit 106 and in particular to a circuit 116 with a back-up battery which renders the contents of the RAM 106 non-volatile.

Figure 4:
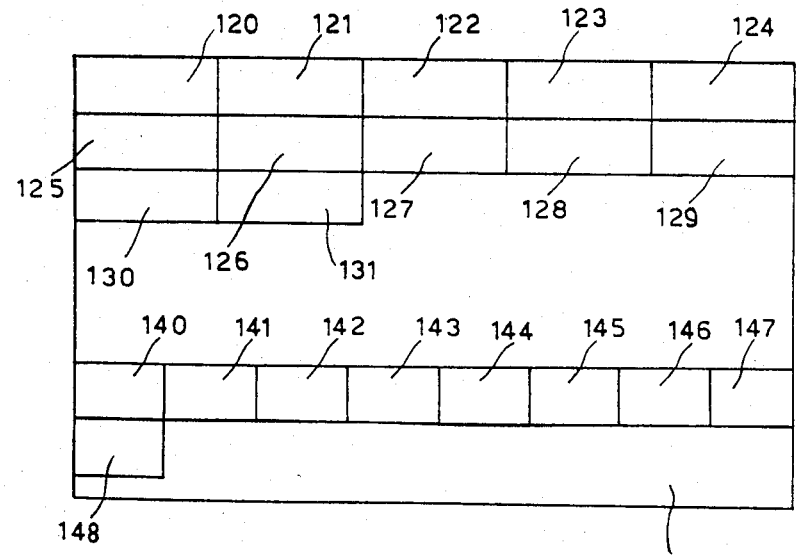
FIG. 4 shows a detail of a block of FIG. 3.

The RAM 106 (FIG. 4) is arranged so as to contain the accumulators of the machine plus various counters, switching elements and working registers. More particularly, the RAM 106 contains a date register 120 and department accumulator registers 121, an increase accumulator register 122, a refund accumulator register 123, a receipts accumulator register 124, outgoings accumulator register 125, a reduction accumulator register 126, a cancelled check slips accumulator register 127, a credit sales accumulator register 128, an accumulator register 129 for the total of actuations of department keys, an accumulator register 131 for the total of issued check slips and a general total accumulator register 130.

Moreover, the RAM contains corresponding registers used as counters, the registers 140, 141, 142, 143, 144, 145, 146, 147 and 148, which are respectively adapted to store the number of actuations of the keys 41 of the individual departments (FIG. 2), the increase key 60, the refund key 55, the receipts key 53 and outgoings key 54, the reduction key 59, the cancelled check slips key 52, the credit sales key 51 and the key 61 for opening the till without any transactions.

In the "OFF" position of the key 70 or 71, all the functions of the machine are deactivated, the till can be opened manually and the contents of the accumulators and the counters of the memory 106 are protected. The position "REG" of the key 70 or 71 defines the normal operating mode of the cash register during working hours. The position "X" of the key 70 or 71 prearranges the machine for printing totals, without zeroizing of registers and counters, the printing being then activated by the TOTAL key 50.

Of particular importance is the closing procedure at the end of the day (or of any predetermined period) with the printing of an end-of-day check slip in which is given all the essential data of the transactions effected. This is carried out by means of the position "Z" of the key 70, which prearranges the machine for printing the end-of-day totals with zeroizing of registers and counters. The printing is activated by the TOTAL key 50, which is the sole enabled key. As in the case of a till receipt check slip 45 for partial transactions (FIG. 5(a)), an end-of-day check slip 80 (FIG. 5(b)) has a line 81 with the date and, optionally, the check slip number and a series of lines of print with totals, some of which begin with "Z" and end with symbols identifying the printed numbers. The lines of print comprise:

(a) a group of lines 151 in which each line carries, on the right, the total of the individual department and the number of the department, and, on the left, the number of actuations of the corresponding key during the day, which is stored in the corresponding registers 121 and in the counters 140 of the RAM 106.

(b) Department total (nominal total), symbol TD, and, on the left, the total actuations.

(c) Nominal net total of receipts, outgoings and returns (effective total), symbol TE.

(d) Real total less credit (ready money in cash), symbol CC.

(e) Total of increases, symbol MA, and, on the left, the number of actuations of the key INC 60, stored in 122 and 141 in the RAM 106.

(f) Total of returned goods, symbol RI, and actuations of the key REFUND stored in 123 and 142.

(g), (h) Totals of cash receipts and outgoings, symbols EN and US, and actuations of the keys CASH IN 53 and CASH OUT 54 stored in 124 and 125 and in 143 and 144, respectively.

(i) Total of reductions, symbol SC, and actuations of the key REDN 59 stored in 126 and 145.

(j) Total of cancelled check slips, symbol CR, and actuations of the key CORR 52 stored in 127 and 146.

(k) Total of credit sales, symbol CG, and actuations of the key CRED 51 stored in 128 and 147.

(l) Total number of actuations of the department keys, symbol NI, which is stored in the non-zeroizable register 129.

(m) Number of actuations of the TOTAL key 50 with the key 70 in the position "Z", which number is indicated by the reference 152 and the symbol NZ and the storage of which will be described hereinafter.

(o) Number of times the till is opened without transactions, symbol N, which is stored in the counter 148 of the RAM 106.

(p) Number of check slips issued, recorded in 131, sumbol NT.

(q) Progressive grand total of the nominal totals, symbol GT, stored in the register 130 of the RAM 106 and non-zeroizable.

The position "SET" which can be reached only by the key 70 is used in the stage of installation of the machine 30 for the initial setting up or when the setting up is modified. Pre-setting is possible in regard to the date in day/month/year, selective activation of the printers 32 and/or 33, rounding-off, the currency symbol at a predefined price or cost, and a reference number of the machine.

The general total registers 130 and the register 129 of the RAM 106 are of "non-zeroizable" type. That is to say, they cannot be zeroized by means of operations with the keys 70 and 71 and with the keys of the keyboard 31 or other connections in the circuits. These registers are moreover protected from a failure of supply. Nevertheless, the RAM 106 can be reset from outside by means of procedures which are generally not within the knowledge of the user, but which hypothetically can be carried out by means of suitable apparatus.

Fraudulent manipulation of the recorded data would then cause one of the most important requirements of a data recording machine to be wanting, which is faithfulness of the operations effected with respect to the amounts recorded and issued.

In order to overcome this problem, the circuit 101 of the machine comprises a counter 157 (FIGS. 9 and 10) which is chosen and connected to the other parts of the circuit and is fixed physically to the machine in such manner as to record, in a permanent and non-manipulatable manner, essential data of the machine and of the transactions recorded. As an example, this counter is incremental and may be electronic or mechanical. In the case of a mechanical counter, this may comprise an electromagnetic which, through the medium of a pawl, shifts by one step the gearing of a revolution counter which accumulates this essential data in its various sections. By means of reverse-acting pawls and end stops for the gears, it is impossible either to decrement or to zeroize this counter. The contents of the various contents of the sections of the revolution counter are read by a series of transducers, for example of brush or wiper type, on code discs of the various sections of the revolution counter. The counter 157 is enclosed in a box fixed to a bottom plate 170 of the machine and cannot be removed without tampering with a seal 158.

It is clear that this counter may also be of electronic type, provided that it meets the requirements of non-decrementability and non-erasibility.

The machine further comprises an mechanical or electronic device 159 sealed to the bottom plate and in which is contained data identifying the machine and corresponding, for example, to the registered number of the machine itself given on the bottom plate 170 and an approval symbol indicating that the machine is not "manipulatable".

Since the recording in the counter 157 of all the transactions effected would be very costly because of the great capacity necessary, as an essential datum of maximum faithfulness the number of actuations of the TOTAL key 50 in the position "Z" of the key 70 is totalled. The end-of-day check slip 80 printed in consequence of this activation has, in fact, good value as proof of the transactions effected in the period under consideration. The number of such check slips issuable during the life of the machine is in turn much smaller than the capacity of counters of moderate cost.

The consequence of every issue of an end-of-day check slip 80 is an incremental rotation by a step of one or more revolutions. The reading of the contents of the counter 157 or of its electronic equivalent allows the number of actuations of the TOTAL key in the position "Z" and of the end-of-day check slips issued to be identified at any moment.

The identifying data and the approval symbol are recorded in the device 159 at the end of the process of production of the machine. During use of the machine, this data will be printed after processing on the journal 47, the check slips 45 and the end-of-day check slips 80 (FIG. 5) so as to reproduce in a logotype 167 the registered number of the machine and a graphic symbol 168.

Possible manipulations can only increment the contents of the counter 157 (FIG. 10), the contents of the device 159 not being modifiable.

The counter 157 and the device 159 are connected by means of cables and a connector 172 to a main board 173 of the circuit 101, to which board the RAM 106 is also connected together with its back-up circuit 116 by means of a board 174. The counter 157 and the device 159 are addressable by the channel 103 (FIG. 9) through the medium of an input and output interface circuit 155. More particularly, on the switching-on of the machine, the microprograms of the ROM 105 transfer to the RAM 106 the contents of the device 159, which will then be printed in the logotype 167 of the check slips 45 and 80.

Figure 5:
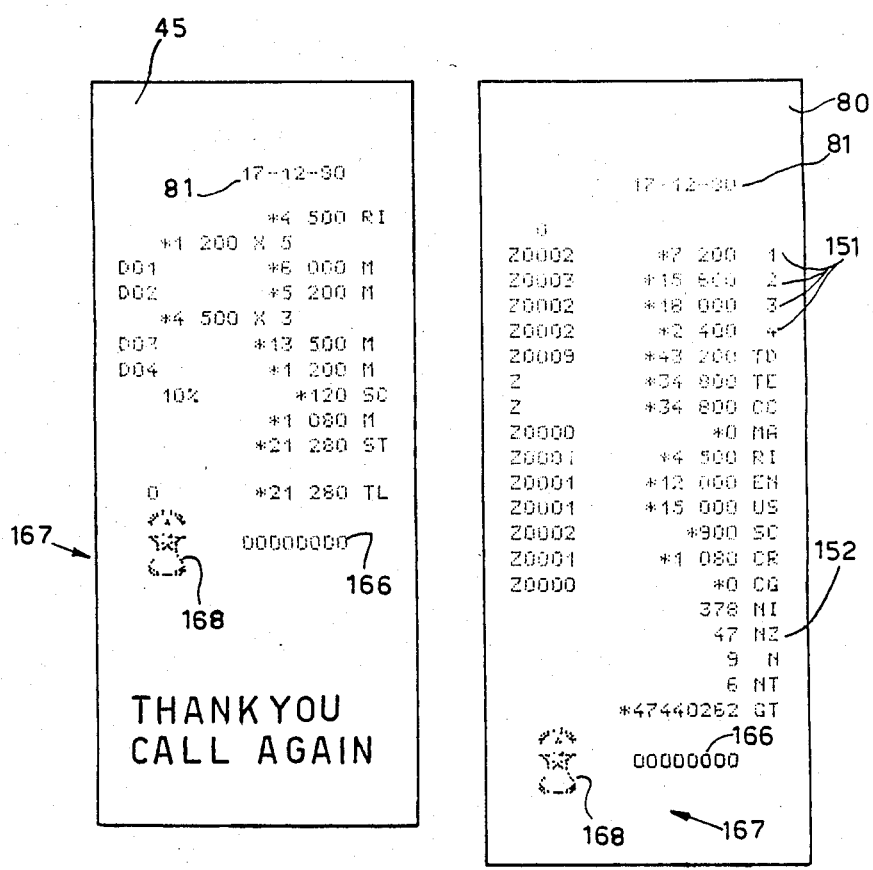
FIG. 5 shows examples of recordings made by the machine of FIG. 1.

When the TOTAL key is actuated in the position "Z", the microprogram, after the printing of the lines from 81 to the total NI, accesses the input line of the counter 157 or of the electronic equivalent, recording the actuation which has taken place. Thereafter, it accesses the output lines of the counter 157, the state of which is decoded and printed as the total number of actuations of the TOTAL key in the position "Z", together with the symbol NZ, in the line 152 of the check slip 80 (FIG. 5). The microprogram then proceeds with the printing of the other totals as far as the logotype 167.

In accordance with an electronic solution of the problem of the invention, the circuit 101 of the machine comprises a memory 160 (FIG. 3), the functions of which are similar to those of the counter 157 and the device 159 so as to record, in a permanent and non-manipulable manner, essential data of the machine and of the transactions recorded. As an example of application which is preferential from the point of view of wide distribution and cost, this memory is of the programmable and UV erasable read-only type, known as EPROM, the cells of which are normally in the logical "1" state and can be brought to the "0" state during programming by means of voltage pulses of a value higher than that normally required for reading them. The "0" state recorded in this way remains permanently stored, can be read a practically unlimited number of times, but can no longer be "erased" except by means of irradiation of the EPROM with ultraviolet rays which bring the contents of all the cells back to "1". By eliminating this possibility by means of screening and impossibility of removal from the machine, the EPROM is rendered recordable once only. Alternatively, it is possible to use a permanently programmable memory known as a PROM, which, after recording, has no possibility of erasure.

Figure 6:
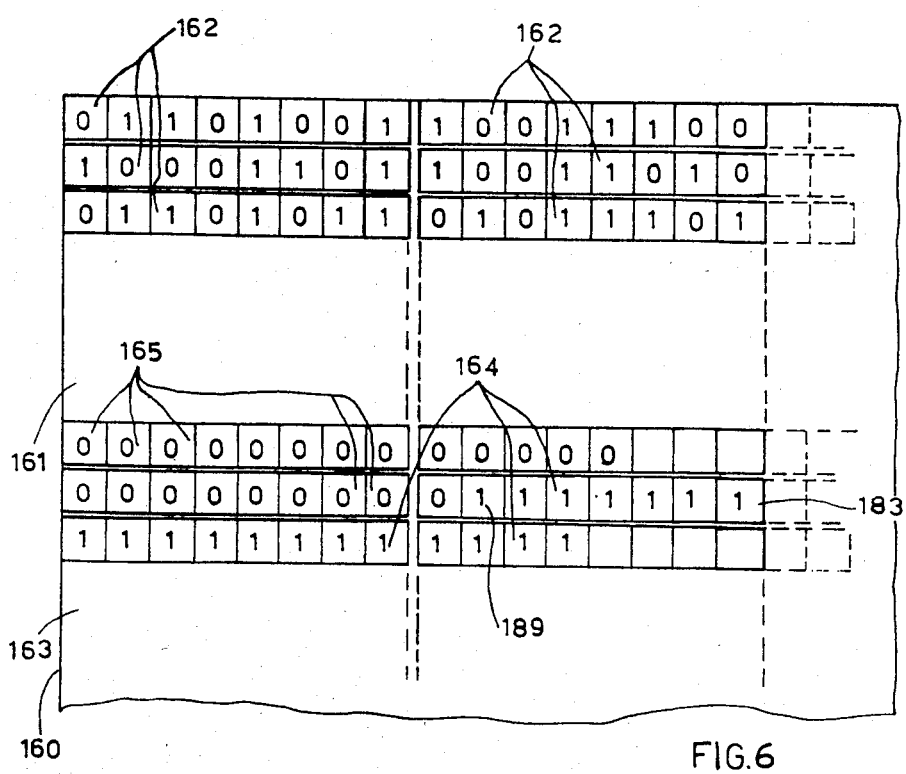
FIG. 6 shows a detail of another block of FIG. 3.

The EPROM 160 (FIG. 6) comprises a small zone 161 in the cells 162 of which there are recordable, always in a permanent manner, the codes of the registered number 166 (FIG. 7) cut or engraved in the bottom 170 and of the approval symbol 168 (FIG. 5) indicating that the machine is not "manipulatable". The remaining and larger part 163 (FIG. 6) of the EPROM is used for recording the data for checking the faithfulness of the recordings.

Also in this case and for reasons of cost, there is recorded in the EPROM, as essential datum of maximum faithfulness, the number of actuations of the TOTAL key 50 in the position "Z" of the key 70, which is printed in the end-of-day check slip 80 (FIG. 5). The EPROMs employed are of commercial type and of moderate cost. For example, INTEL's EPROM 2716, the capacity of which is 16,384 bits, enables about 14,000 end-of-day check slips to be issued, sufficient to cover more than 35 years of use of the machine.

The cells of the zone 163 of the EPROM 160 are addressable in sequence. Every issue of a check slip 80 causes the switching of the first of the cells 164 still in the "1" state to "0". Reading of the EPROM 160 can allow the number of actuations of the key 50 in the position "Z" and of the end-of-day check slips issued to be identified.

The identifying data and the approval datum are recorded in the EPROM 160 at the end of the process of production of the machine. During use of the machine, this data, after processing performed by the circuit 101, will be printed on the journal 47, the check slips 45 and the end-of-day check slips 80 (FIG. 5) is dots so as to reproduce the logotype 167. More particularly, while the registered number 166 is printed on one line, the symbol 168 is always printed in dots on three lines and in the line-spacing space between the second and third lines and results from the combination of matrices of dots, the code of which is not among those of the alphanumeric characters normally used. In this way, the use of calculating machines, even programmable calculating machines, which utilize the dot printer of the said Italian Pat. No. 1,036,375 is impossible for producing fake end-of-day check slips 80. Also in this case, manipulations, even sophisticated manipulations, can only increment the contents of the EPROM 160, the zone 161 being inaccessible to writing.

If physical preservation of the end-of-day check slips 80 (FIG. 5) is imposed, one for every day and for each actuation of the total key in the position "Z", this is verified by the fact that in a line such as 152 every check slip has a progressive number equal to the number of preceding check slips as identified in the counter 157 or in the EPROM 160. Since this datum cannot be manipulated, the presence of all the check slips and of the journal 47 permits an accurate check of all the recorded transactions as a function of one or of all of the daily totals TD, TE and CC, of the various numbers of actuations and of the Grand Total GT.

Figure 7:
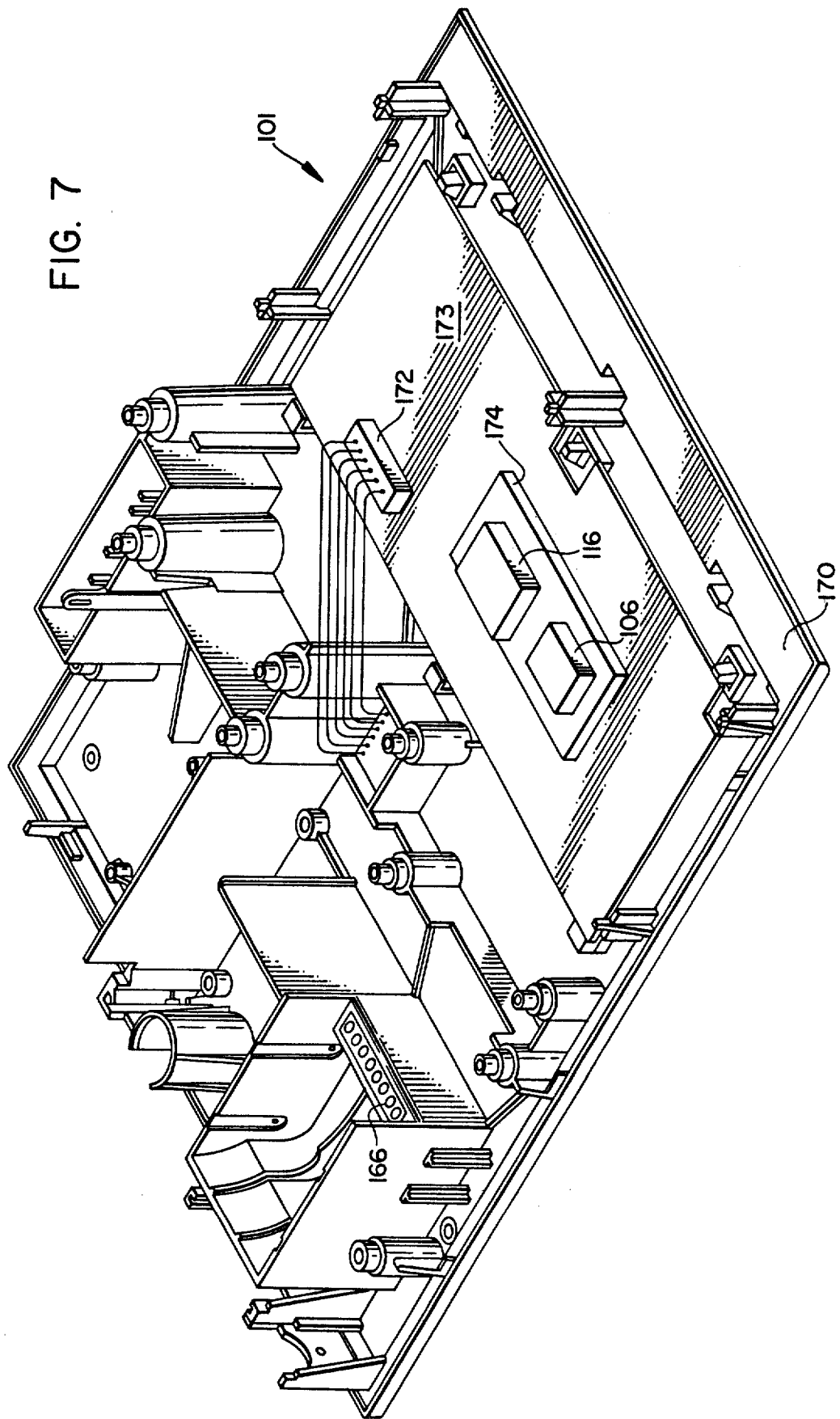
FIG. 7 shows another detail of the machine of FIG. 1.

Referring to FIG. 7, the EPROM 160 is also fixed irremovably to the bottom plate 170 of the machine and in such manner that it is screened from possible ultraviolet radiations, for example by means of a cover furnished with seals. By way of alternative, the EPROM may be rendered integral with the bottom plate by permanent enclosure in a cavity thereof by means of epoxy resins or the like which are polymerizable in situ. The irremovability is obviously not absolute, but is guaranteed only by the integrity of the seals or of the enclosing resin. The EPROM 160 is connected by means of cables and the connector 172 to the main board 173 of the circuit 101, to which main board the RAM 106 and its buffer circuit 116 are also connected by means of the board 174.

In the case of the EPROM 2716, its cells are addressable by the bus 103 (FIG. 3) through the medium of a buffer register (latch) 178 strobed via a line 180 by a decoder 179 for the data on the channel 103. The cells of the EPROM 160 are readable in bytes of 8 bits when a line 187 to the EPROM is activated, for example, by transfer of the data of a buffer register 185 connected to the channel 104 and strobed by a line 186. The byte read is staticized in an input and output register 181 which, when it is enabled by the decoder 179 via a line 182 transfers this data on the channel 104. On the switching-on of the machine, the microprograms of the ROM 105 transfer to the RAM 106 the contents of the zone 161, which will then be printed in the logotype 167 of every check slip 45 and 80. This guarantees that every check slip issued comes from a "non-manipulatable" machine.

Figure 8:
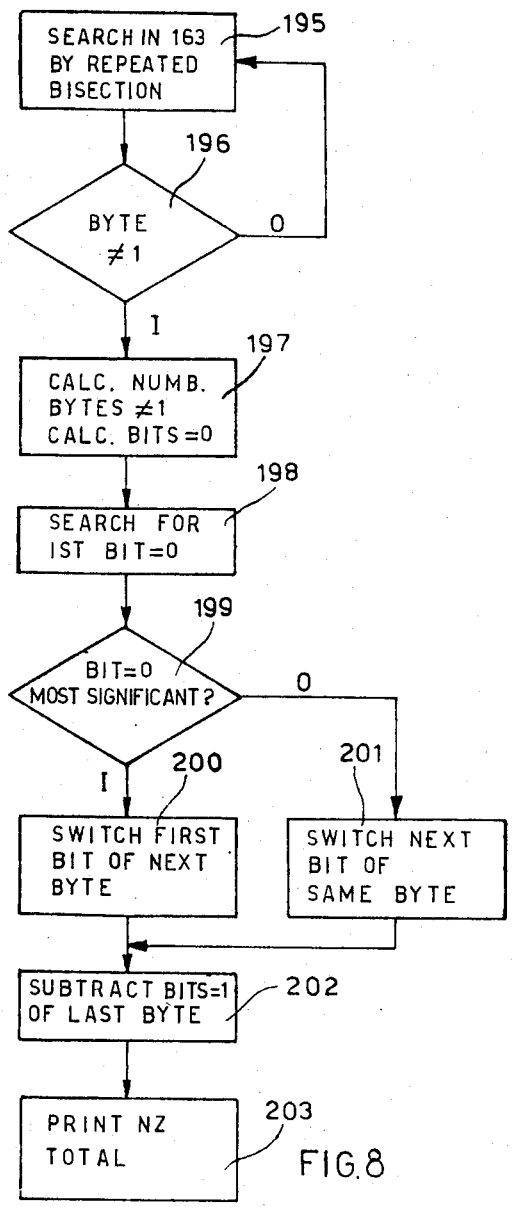
FIG. 8 is a flow diagram of an operative stage of the machine.

When the TOTAL key is actuated in the position "Z", after the printing of the lines from 81 to NI (FIG. 5), the microprogram gives access via the register 178 (FIG. 3) to a half-way address in the zone 163 and, by a method of search by repeated bisection and decision 196 (block 195, FIG. 8), identifies the last byte whose cells are not all in the "1" state. On the basis of the address of this byte and of the address of the first byte of the zone 163, it determines the number of bytes different from "1", then, multiplying this number by eight, computes the bits thereof, block 197, searches for the first bit at "0" in the last byte different from "1", block 198, points to the adjacent cell still at "1", decision 199, such as the cell 189 of FIG. 6, and generates a byte with the changed-over bit. This is staticized in the register 181 (FIG. 3), now used as an output register, by activation of a line 184 of the decoder 179. Recording in the EPROM 160 then takes place by activation of an enabling line 188 of the EPROM through the agency of the register 185 via the decoder 179. Finally, the same register 185 activates through a line 189 and a line 190 the transfer of the byte of the register 181 to the EPROM and, through the line 190, a circuit 191 connected to the power supply 115, which sends via a line 193 the pulse of relatively high voltage which causes the recording of the changed-over "0" bit in the addressed cell, block 200 or 201 of FIG. 8. Finally, the microprogram continues with the subtraction of the bits at "1" of the last byte from the number of bits previously computed, block 202, and starts, block 203, the printing of the symbol "NZ" and of the number determined in this way in the line 152 of the check slip 80 (FIG. 5). The microprogram then proceeds with the printing of the other totals as far as GT and the logotype 167 already described.

Since the recording of every actuation of the TOTAL key in the position "Z" takes place one bit at a time, while the parallelism of the EPROM is eight, in the end recording is effected eight times in one and the same byte of the zone 163. It may also happen, rarely, that one of the bits already changed over to "0" is able to return to "1" owing to the effect of the repeated recordings. The microprogram provides a check or control of the byte by discarding the contents of cells in the "1" state which might have to be present between the cells already changed over to "0" and those of bytes with cells at "1" between bytes with cells at "0".

It is clear that modifications, variations and coding of the permanently recorded data may be carried out in the machine and the improvements described without departing from the scope of the invention. The machine for making records may be of a simpler type such as a single-department cash register, without a visual display panel and with a single duplicating printer for check slip and journal, or of a more complex type in which connections of the machine to peripherals are provided and/or in which the issue of an end-of-day record takes place automatically at the end of a predetermined period computed by the machine. In this last case, the number of actuations to be counted is that determined by the issue of the data of these partial transactions. The RAM memory may be protected by seals. Moreover, methods of addressing and recording which are different from those described by way of example may be provided. Further verifications of the permanently recorded data and other stored data of maximum faithfulness in addition to the data already described and possibly even combined with special parity codes of recorded data may moreover be provided. The counter may be electronic and of a different type from that described. It is also clear that the identifying and approval data of the machine may be recorded in an additional device or in a permanent memory different from that for storing the actuations of the Total key in the position "Z", as well as that other methods of fixing the memory to the machine are also equivalent.

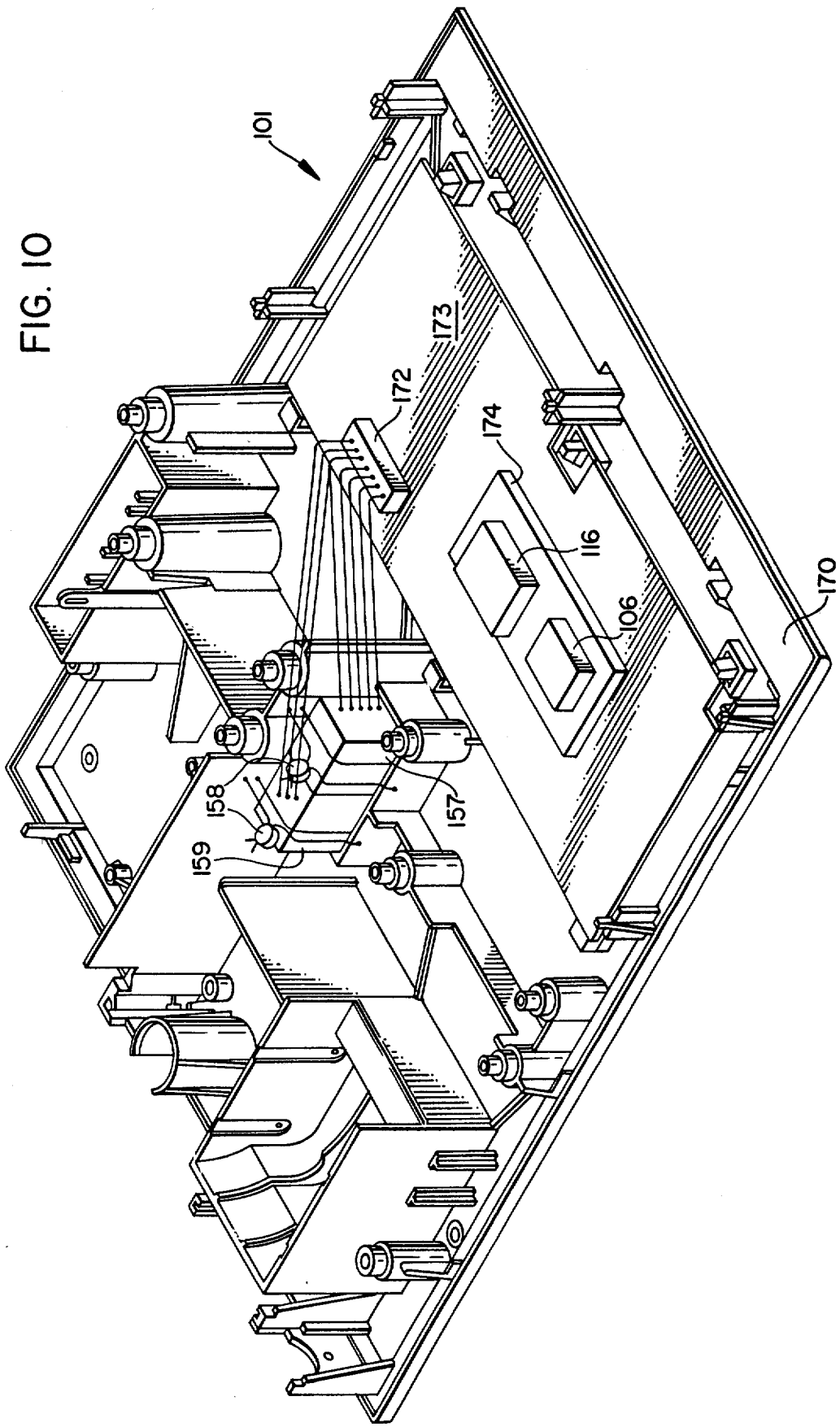

What we claim is:

1. In a transactions recording machine comprising: a frame; a keyboard including numeric and service keys for entering and executing transactions and selector means actuatable for defining either a recording status for enabling the recording and execution of said transactions or a check status for reporting the recorded transactions; printing means for printing said transactions; and electronic means for controlling records, executions, reports and printing of said transactions, wherein said electronic means are removably mounted on said frame and include totalizing memory means for storing totals of said transactions, wherein said electronic means respond to one of said service keys in the record status of the machine for causing said printing means to print the executed transactions on till receipts and wherein said electronic means respond to the actuation of said selector means in said check status for the actuation of said selector means in said check status for causing said printing means to print the report of the recorded transactions on check slips, the improvement comprising:

counting means for counting signals in a purely incremental and non-manipulatable manner;

fixing means for permanently and non-manipulatably fixing said counting means to the machine frame;

incrementing means controlled by said electronic means and responsive to each actuation of said selector means in said check status for incrementing the content of said counting means, whereby each actuation of the selector means in the check status is stored permanently and not cancellably;

means for reading-out the content of said counting means; and means responsive to the actuation of said selector means in said check status and to the read-out content of said counting means for causing the printing on the check slip of the total of the previous actuations of said selector means in the check status and the content of said totalizing memory means.

2. A machine according to claim 1, wherein said frame includes a registered number of the machine, further comprising identification memory means permanently storing an identification code associated with said machine number, wherein said identification memory means are permanently and non-manipulatably fixed to said frame and wherein said electronic means respond to the content of said identification memory means for causing said printing means to print said registered number on said till receipts and on said check slips.

3. A machine according to claim 1, further comprising identification memory means for permanently storing graphic codes different from numeric codes, wherein said memory means are permanently and non-manipulatably fixed to said frame, and wherein said electronic means respond to said graphic codes to cause the printing means to print on said till receipt and on said check slip a graphic logotype associated with said graphic codes indicative that the machine is non-manipulatable.

4. In a transaction recording machine comprising: a frame having an identification machine number readable thereon; a keyboard including numeric and service keys for entering and executing transactions and selector means actuatable for defining either a recording status for enabling the recording and execution of said transactions or a check status for reporting the recorded transactions; printing means for printing said transactions; and electronic means for controlling records, executions, reports and printing of said transactions, wherein said electronic means include totalizing memory means for storing totals of said transactions, wherein said electronic means respond to one of said service keys in the record status of the machine for causing said printing means to print the executed transactions on till receipts and wherein said electronic means respond to the actuation of said selector means in said check status for causing said printing means to print the report of the recorded transactions on check slips, the improvement comprising:

mono-recording means including identification cells and counting cells wherein a bit can be written and read but not cancelled in each of said cells, and wherein said identification cells store identification bits associated with the readable machine number of said frame;

fixing means for permanently and irremovably fixing said mono-recording memory to the machine frame;

recording means controlled by said electronic means and responsive to each actuation of said selector means in said check status for recording in an orderly way a bit indicative of a corresponding actuation of said selector means in the check status in a new cell of the counting cells of said mono-recording memory, whereby each actuation of the selector means in the check status is stored permanently and not cancellably in a different cell of said cells; and means responsive to the actuation of said selector means in said check status and to recorded bits of said counting cells and said identification cells for causing said printing means to print on the check slip the total of the previous actuations of said selector means in the check status, said machine number and the content of said totalizing memory means.

5. A machine according to claim 4, wherein said mono-recording means permanently and non-manipulatably stores graphic codes different from numeric codes, and wherein said electronic means respond to said graphic codes to cause the printing means to print on said till receipt and on said check slip a graphic logotype associated with said graphic codes and indicative that the machine is non-manipulatable.

6. A machine according to claim 4, wherein said printing means is of the dot matrix type and wherein said graphic codes enable said printing means to print said graphic logotype according to a dot matrix different from any numeral digit.

7. A machine according to claim 4, wherein said mono-recording memory is an electrical programmable read only memory and said recording means comprises a current generator feeding a current signal having a voltage higher than the voltage of the signals required by said electronic means and wherein said electrical programmable memory is shielded to be non-eraseable.

8. A transactions recording machine comprising: a keyboard including numeric and service keys for entering and executing transactions and selector means actuatable for defining either a recording status for enabling the recording and execution of said transactions or a check status for reporting the recorded transactions; totalizing memory means for storing totals of said transactions; printing means for printing said transactions on till receipts in the record status of the machine; electronic check means responsive to the actuation of said selector means in said check status for causing said printing means to print the report of the recorded transactions on check slips; and report check means for permanently and not cancellably storing each actuation of said selector means in said check status comprising:

- mono-recording memory means including counting cells wherein a bit can be written and read but not cancelled in each of said cells, wherein said cells are addressable in an orderly way;
- addressing means for sequentially addressing said counting cells for finding the address of a first cell of said counting cells wherein no bit is recorded;
- recording means responsive to each actuation of said selector means in said check status for storing in said first cell a bit indicative of a corresponding actuation of said selector means in the check status;
- reading means responsive to the actuation of said selector means in said check status for reading the content of said cells for generating a counting code associated with the number of cells storing said bit; and
- means responsive to the counting code for causing the printing means to print on the check slip the total of the previous actuations of said selector means in the check status and the content of said totalizing memory means.

9. A machine according to claim 8, wherein said mono-recording memory means comprises a plurality of identification bits permanently storing an identification code associated with a registered number of the machine and wherein said electronic check means responds to the content of said identification memory means to cause said printing means to print said registered number on said check slip.

10. A machine according to claim 8, wherein said electronic means are removable from the machine and said mono-recording means are permanently and non-manipulatably fixed to a part of said machine.

11. A machine according to claim 8, wherein said mono-recording means permanently store graphic codes different from numeric codes, and wherein said electronic means respond to said graphic codes to cause the printing means to print on said till receipt and on said check slip a graphic logotype associated with said graphic codes and indicative that the machine is non-manipulatable.

12. A machine according to claim 8, wherein said cells are distributed in groups, wherein said addressing means selectively and sequentially check said group of cells for identifying the last group of cells wherein at least one cell does not store a bit.

13. A machine according to claim 12, wherein said accessing means accesses said first cell of said last group if said group contains a not recorded cell, or, in alternative, said address means accesses said first cell in a group of cells not storing bits, if said last group of cells includes only cells storing a bit.

14. A machine according to claim 8, wherein said addressing means accesses the cells of said mono-recording memory according to a search by repeated bi-section of the addresses of said groups of cells.

15. A machine according to claim 8, wherein said totalizing memory means comprise a random access memory rendered non-volatile by a back-up memory.

16. A machine according to claim 8, wherein said mono-recording memory means is an electrical programmable read only memory (EPROM).

17. A machine according to claim 16, wherein the counting cells of said EPROM not storing said bit are on "one" status and the cells including said bit are on "zero" status.

* * * * *

UNITED STATES PATENT AND TRADEMARK OFFICE
CERTIFICATE OF CORRECTION

PATENT NO. : 4,493,038
DATED : January 8, 1985
INVENTOR(S) : Michele Bovio

It is certified that error appears in the above—identified patent and that said Letters Patent is hereby corrected as shown below:

Please insert the attached three sheets of formal drawings.

Claim 1, column 9, lines 23 and 24, delete "the actuation of said selector means in said check status for".

Signed and Sealed this

Fifteenth Day of October 1985

[SEAL]

Attest:

Attesting Officer

DONALD J. QUIGG

Commissioner of Patents and Trademarks—Designate